June 20, 1939.                C. K. BASSETT                2,163,444
                               LIQUID METER
                          Filed March 24, 1938
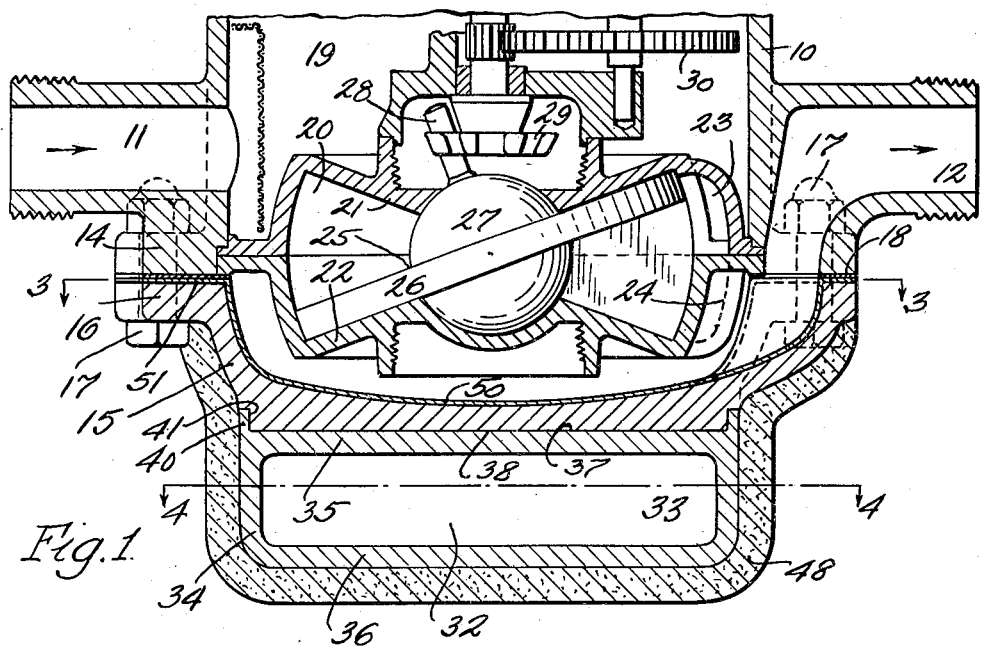
Fig.1
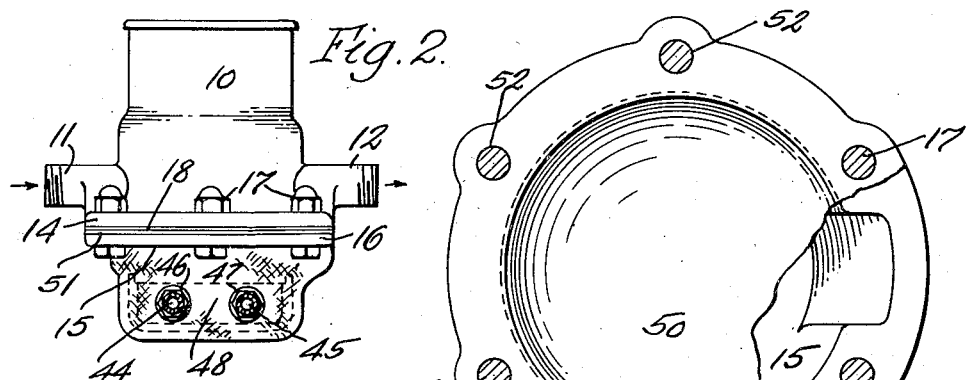
Fig.2                                                Fig.3
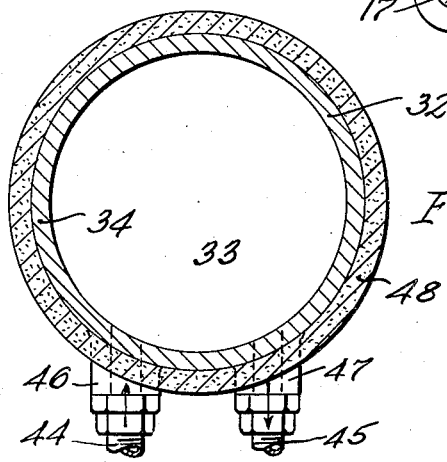
Fig.4
INVENTOR.
Charles K. Bassett
by Parker, Rockwow & Farmer
ATTORNEYS.

Patented June 20, 1939

2,163,444

UNITED STATES PATENT OFFICE 2,163,444

LIQUID METER

Charles K. Bassett, Buffalo, N. Y.

Application March 24, 1938, Serial No. 197,898

1 Claim. (Cl. 73—258)

This invention relates to improvements in liquid meters which are used to measure and indicate the quantity of a liquid passed through the meter.

Meters of this kind as heretofore constructed, while being accurate and entirely practical for measuring ordinary liquids, the condition or consistency of which does not change in variations in temperature, are not well adapted for handling relatively thick and heavy liquids, such for example as asphalt which, to be passed through and measured by a liquid meter, has to be raised to a high temperature and maintained in that condition while passing through the meter.

Prior to my invention, as far as I am aware, no means has been provided whereby thick liquid in or passing through a meter could be maintained at a required high temperature, and considerable trouble resulted, due to gumming or clogging of the meter, and this was particularly true after a batch of heated material of this kind had been metered, since the material which was left in a meter became set or relatively thick upon cooling. Hence, upon starting another run of such material, the thickened material remaining in the meter from the previous metering had to be melted or removed in some manner, either by crude attempts at heating the meter, or by taking it apart and cleaning it.

An object of this invention is to construct a novel liquid meter or measuring device with which heated, relatively thick materials such as asphalt and the like may be accurately metered and the desired temperature of the liquid maintained while passing through the meter; also to construct a meter of this kind in which any thickened or solidified material left in the meter may be readily heated and liquefied so as to be readily discharged therefrom without the necessity of taking the meter apart for cleaning or removal of the thickened material.

Another object of the invention is to construct a liquid meter or measuring device having a wall or part thereof formed of material of high heat conductivity for the transfer of heat therethrough to the interior of the meter; also to construct a meter of this kind having a heating jacket or chamber formed as a part thereof or which may be secured thereto and into which a suitable heating medium may be introduced to maintain the meter and its contents at a desired temperature; also to provide a meter of this kind with means for preventing corrosion of the heat-conducting wall or part thereof as the result of contact with fluids or materials passing through the meter; and also to provide means for preventing to a large extent the loss of heat from the meter and its heating jacket by radiation through the outside walls.

Other improvements and advantages of this invention will be apparent from the following disclosure of an embodiment thereof and the novel features of the invention will be pointed out in connection with the appended claim.

In the accompanying drawing:

Fig. 1 is a longitudinal, vertical section of a part of a liquid meter or measuring device, illustrating an embodiment of my invention.

Fig. 2 is a side elevation thereof, on a reduced scale.

Fig. 3 is a horizontal section thereof, taken approximately on line 3—3, Fig. 1.

Fig. 4 is a similar view taken on line 4—4, Fig. 1.

I have illustrated in Fig. 1 a portion of a meter which, except as hereinafter specified, may be of standard form and construction, including a main casing 10. This casing is provided with inlet and outlet passages 11 and 12 respectively for the introduction and discharge of the material to be metered, and at its lower end the casing has an opening defined by a marginal flange 14. To this flange is secured a base 15 which depends below and closes the opening of the casing 10, a marginal flange 16 being provided for attachment to the base flange 14 of the casing 10, as by suitable bolts or devices 17. A gasket 18 is disposed between the flanges 14 and 16, whereby the space 19 within the meter is sealed against leakage.

Arranged in the space 19 is a measuring chamber 20 of any suitable construction, that shown being formed of two opposed shells 21 and 22, provided respectively with inlet and outlet ports 23 and 24 for the introduction to and discharge from the measuring chamber of the liquid material to be measured. Within the measuring chamber is arranged a disk piston 25 of usual construction having a disk 26 and a bearing sphere 27 cooperating respectively with the walls of the measuring chamber and with concave seats formed centrally of the sections 21 and 22. An axial stud 28 projecting from the bearing sphere 27 cooperates with a gear 29 in such a way that for each complete oscillation of the disk piston in the measuring chamber, the stud 28 will turn the wheel 29 one complete rotation about its axis to thereby actuate the counting or indicating mechanism, a portion of which is indicated at 30. Upon reference to Fig. 1, it will be noted that the bottom wall and upwardly flaring side walls or portions of the base section 15 of the outer casing are disposed quite close to the sections 21, 22 forming the measuring chamber 20.

The joint between the casing 10 and the lower or base member 15, is as seen in Fig. 1, disposed on a horizontal plane passing approximately through the center of the measuring chamber 20. All of these parts as thus far described are of the usual, well known construction and of themselves form no part of the present invention.

Heretofore the base section or member 15 as well as the main casing 10 have usually been made of some form of cast iron. However, since cast iron is, relatively speaking, a poor conductor of heat, I propose to make the base member 15 of aluminum or of some other equally good heat conducting material, advantage being taken of this fact for the transference or conduction of heat through the wall of the member 15 from the outer side thereof to the space 19 within the meter. Accordingly, I form upon or secure to the outer or lower face of the base member 15, means which may be employed for applying heat to this member.

In the example illustrated, see particularly Fig. 1, I form a separate jacket or heat-applying member 32 which is in the form of a hollow, preferably cast body having a chamber 33 therein into which a suitable heating medium may be introduced. In the construction shown, the jacket 32 includes an annular wall 34 connecting top and bottom, preferably parallel walls 35 and 36, thus forming a closed chamber. This jacket can be secured to the member 15 in any suitable way, and I form the base member 15 with a flat bottom wall or face 37 against which the corresponding top face 38 of the wall 35 of the jacket 32 may closely engage. To secure the two members together, the jacket 32 may be provided with an upstanding annular flange 40 which may be engaged with or suitably secured to a correspondingly shouldered part 41 surrounding the lower portion of the base member 15. The flange 40 may be permanently secured to the member 15 by brazing, soldering or the like, or the parts may be threaded for detachably securing the jacket to the base if desired.

I have shown and described the jacket 32 as having a top wall 35 to thereby provide a self-contained chamber or enclosure. By forming the jacket as a completely enclosed unit, this element or unit may be tested for pressure before being assembled and sent from the factory.

It should be here understood that the jacket 32 can be formed of any suitable material and need not necessarily be formed of aluminum, since if desired, this member may be formed of cast iron or other material.

Any suitable means may be provided for introducing heat into the jacket 32 and any suitable heating medium may be used. In the illustrated embodiment of the invention, I have shown, see particularly Figs. 2 and 4, inlet and outlet pipes 44 and 45 respectively, which are connected to inlet and outlet bosses or connections 46 and 47 on a wall of the jacket 32, by which steam or steam and hot water may be supplied to and returned from the chamber. However, other suitable means or heating media for this purpose may be substituted if desired.

In order to prevent loss of heat through the side wall 34 and bottom wall 36 of the jacket 32, this jacket as well as the outer face of the adjacent base member is preferably covered with a layer of suitable insulating material 48, as illustrated in Figs. 1 and 2, which is preferably permanently attached, thus preventing loss of heat and increasing the efficiency of the jacket 32. Asbestos plaster is well suited to this purpose, but other materials may be used if desired.

When the meter casing is formed of cast iron or other alloys of the type generally employed in the manufacture of these meters, very little, if any, corrosion occurs as the result of contact therewith of the liquids or materials passing through the meter. However, since as before stated, I have substituted aluminum for cast iron in the base 15 of the meter, and since aluminum has a tendency to corrode upon contact therewith of certain materials, which may be introduced into the meter, I preferably provide means for keeping such materials out of direct contact with the inner wall or face of the base 15, while at the same time maintaining the conduction of heat from the jacket 32 through the bottom wall of the base 15 at the maximum efficiency.

For this purpose, I provide a relatively thin liner or member 50, preferably made of sheet copper or other material of high heat conductivity and high resistance to corrosion which conforms to the shape of the inner wall or surface of the base member 15, as shown clearly in Figs. 1 and 3. This liner 50 is preferably secured in place in contact with the inner wall of the base 15 by means of an annular flange 51 formed on the liner and which may extend between the flanges 14 and 16 of the main casing and the base member 15, in contact with the gasket 18. The flange 51 of the liner 50 is provided with a series of holes 52 disposed so as to register with the holes in the flanges 14 and 16 and in the gasket 18, so that the bolts or fastening devices 17 will pass therethrough, and when tightened, will secure the liner member 50 securely in position.

By means of the construction disclosed, the lower section 15, the liner 50, and the outer, insulating jacket 48 may be removed as a unit, to expose and give access to the measuring chamber 20, by merely taking out the bolts or fastening devices 17.

While I have shown a separate liner for preventing corrosion, I could form the base of bronze, which is a good conductor of heat, in which case, a separate liner could be dispensed with, but I prefer to use a separate liner as such a construction would be much less expensive than the use of bronze, as referred to above.

I claim as my invention:

A liquid meter for handling liquids at high temperatures, comprising an inner relatively broad and shallow casing forming a measuring chamber of the type having a nutating piston therein, an outer casing including an upper section and a lower section separably joined on a substantially horizontal plane passing approximately through the center of said inner casing, said meter having indicating mechanism in said upper section above said measuring chamber, and said mechanism having operative connection with said nutating piston, said lower section being formed of aluminum and having a bottom wall which extends beneath and relatively close to the casing of said inner chamber and having an annular side wall which extends up around the sides of and relatively close to the inner chamber casing, a thin copper liner conforming in shape to and fitting against the inner face of said bottom and side walls of said lower outer casing section, a hollow chambered heating jacket having a top wall conforming to and fitting against the lower face and adjacent side portions of said outer lower casing section, and means for introducing heat into said jacket whereby material passing through said measuring chamber may be heated by the transference of heat from said jacket through said aluminum walls of said outer lower casing section and said copper liner to and around the adjacent measuring chamber, said jacket and said side walls of said lower outer casing section having a permanently secured unitary heat insulating outer covering thereon, and means for detachably securing said upper and lower outer casing sections together so that upon separating said sections, said inner measuring chamber may be rendered accessible, while said lower section, said liner, said jacket and said insulating covering are removable as a unit.

CHARLES K. BASSETT.